United States Patent [19]

Chavarria et al.

[11] Patent Number: 4,623,186
[45] Date of Patent: Nov. 18, 1986

[54] ENGINE WASHING COVER FOR CAB-OVER ENGINES

[76] Inventors: Jose F. Chavarria; Tina F. Chavarria, both of P.O. Box 853, San Jacinto, Calif. 92383

[21] Appl. No.: 806,710

[22] Filed: Dec. 9, 1985

[51] Int. Cl.$^4$ .............................................. B62D 63/00
[52] U.S. Cl. .................... 296/1 R; 180/313; 134/175; 134/183; 134/200; 296/194
[58] Field of Search .............. 296/1 R, 190; 180/89.13, 313; 134/182, 183, 175, 200

[56] References Cited

U.S. PATENT DOCUMENTS

| | | | |
|---|---|---|---|
| 2,536,843 | 1/1951 | Dye | 134/183 |
| 2,717,017 | 9/1955 | Feasey et al. | 150/52 |
| 2,771,895 | 11/1956 | Bond | 134/175 |
| 2,972,353 | 2/1961 | Quest | 134/200 |

Primary Examiner—Robert R. Song
Attorney, Agent, or Firm—Klein & Szekeres

[57] ABSTRACT

A removable cover for the engine compartment in a cab-over-engine motor vehicle comprises a frame that fits around the engine access opening in the cab of the vehicle, and an inflatable cover element sealingly attached around its peripheral edges to the frame. The cover element, when inflated, has an aperture or passage through which a hose or the like can be inserted to clean the engine. The cover element is wholly or partially transparent to allow the user to observe and direct the hose. The frame is hinged so that the cover can be folded for easy storage when the cover element is deflated.

17 Claims, 5 Drawing Figures

U.S. Patent  Nov. 18, 1986  Sheet 1 of 2  4,623,186
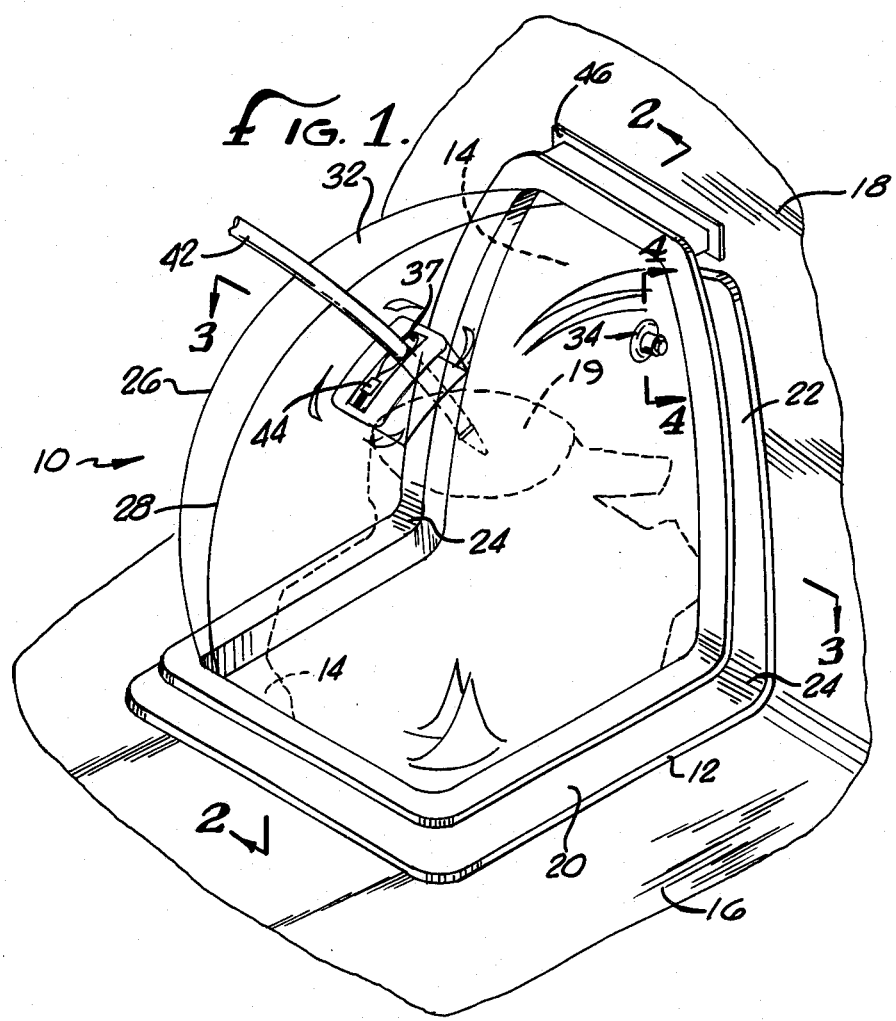
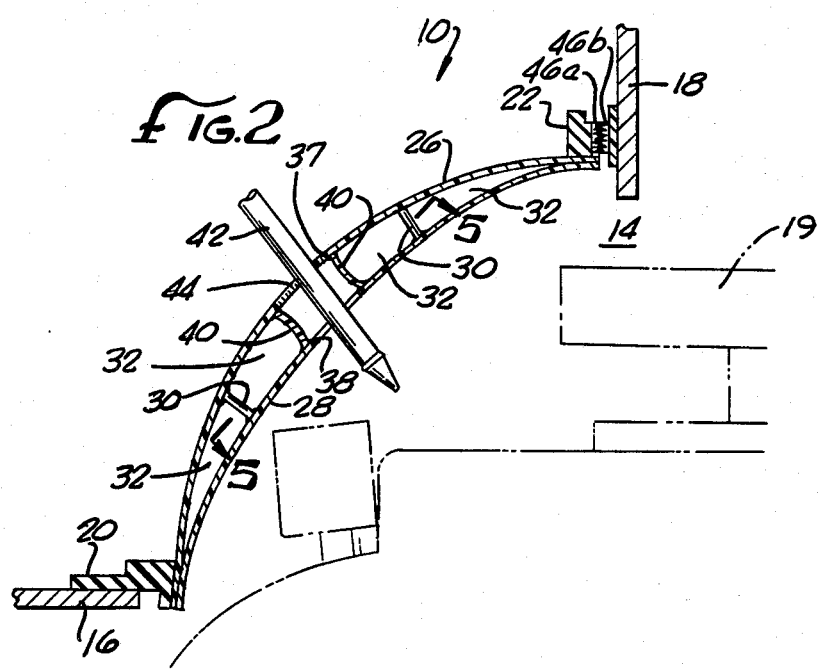

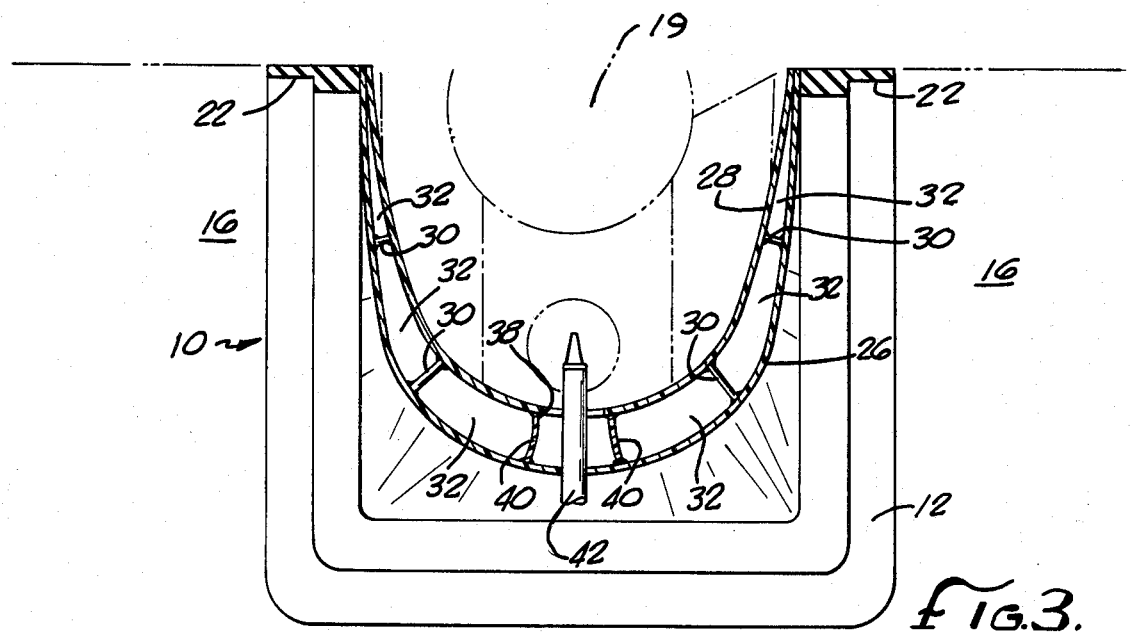
fig.3.
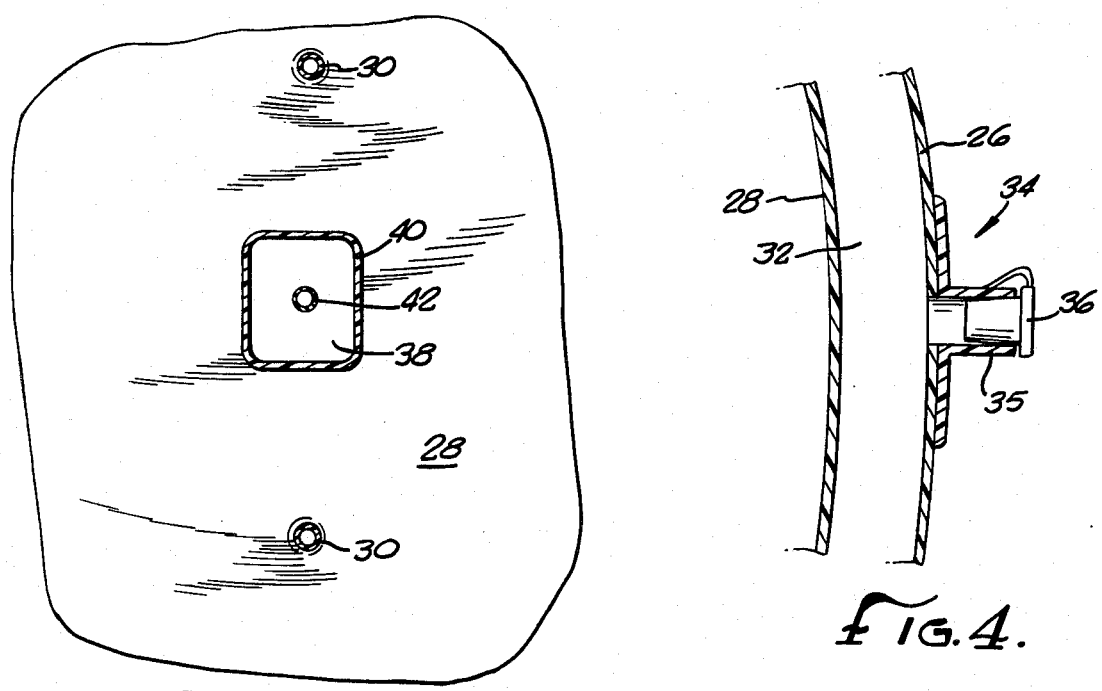
fig.5.
fig.4.

ENGINE WASHING COVER FOR CAB-OVER ENGINES

BACKGROUND OF THE INVENTION

This invention relates to the field of protective devices for motor vehicle engines and the like. In particular, it relates to a removable cover or enclosure for a cab-over engine compartment that allows the engine to be conveniently cleaned or washed without spray or residue entering the cab of the motor vehicle.

The "cab-over-engine" (or "cab-on-engine") configuration for motor vehicles has been in widespread use in recent years, especially with the increasing popularity of vans, "mini-vans", and recreational vehicles built on a van chassis. In the cab-over-engine configuration, the engine compartment projects backwardly through the firewall of the vehicle into the passenger area or cab, usually between the front seats of the vehicle. The engine compartment is provided with a molded housing or cover which encloses the engine and covers the openings in the firewall and floor of the vehicle that accommodate the engine. This cover must be removed to service or clean the engine.

A common method used to clean the engine is simply to spray water on it from a hose. With the cover removed, however, the spray of water and removed dirt from the engine can soil the carpeting and upholstery in the cab of the vehicle.

Accordingly, there has been a long-felt, but as yet unsatisfied, need for a protective device that permits the engine to be washed, yet which protects the interior of the vehicle during the washing. Such a device should be easily installed in place of the molded engine cover, and it should be conveniently storable when not in use. Moreover, when used, it should not obscure the user's view of the engine.

SUMMARY OF THE INVENTION

Broadly, the present invention is a collapsible engine cover for a cab-over engine, comprising a frame that fits around the engine access opening in the cab, and an inflatable cover element sealingly attached around its edges to the frame. The cover element, when inflated, has an aperture or passage through which a hose or other cleaning implement can be inserted to wash or clean the engine. To this end, the cover element, or at least a substantial portion of it, is transparent, to allow the user visually to direct the cleaning implement. The frame is foldable, so that when the cover element is deflated, the entire engine cover assembly can be folded for easy storage.

In a specific preferred embodiment, the cover element comprises inner and outer sheets of inflatable transparent material. The two sheets are spaced apart by collapsible spacers, thereby defining an inflatable space or chamber between the sheets. The sheets are sealingly attached around their edges to a foldable or hinged frame that is adapted to rest on the floor and on the firewall of the cab around the engine access opening. Each of the sheets has a central aperture, the two central apertures being in registration, with the sheets being sealingly attached to each other around the periphery of the registered apertures.

Air from a suitable source is introduced into the inflatable chamber through an inflation valve of conventional design. The inflation or expansion of the chamber causes the sheets to separate from one another, thereby expanding the spacers to their maximum extension. This maximum extension of the spacers limits the maximum separation of the sheets. The resulting structure is a semi-rigid outer cover element spaced from a semi-rigid inner cover element, both defining an outwardly-convex shell-like structure. The registered apertures in the two sheets provide the aforementioned passage for the cleaning implement. If desired, this passage can be provided with suitable closure means, such as a zipper.

The device is advantageously provided with detachable fastening means for removably attaching the frame to a portion of the firewall. In the preferred embodiment described herein, hook-and-loop fasteners are used, but other fastening devices may be readily substituted.

The present invention thus provides a conveniently-used cover that allows the engine to be washed while protecting the interior of the vehicle. Its transparent material allows the user to have an unobscured view of the engine while washing it. In addition, the cover can be quickly and easily installed, and just as easily deflated and folded for storage in a relatively small space.

These and other advantages will become apparent in the detailed description which follows.

BRIEF DESCRIPTION OF THE DRAWINGS

FIG. 1 is a perspective view of an engine cover in accordance with a preferred embodiment of the present invention;

FIG. 2 is a cross-sectional view along line 2—2 of FIG. 1;

FIG. 3 is a cross-sectional view along line 3—3 of FIG. 1;

FIG. 4 is a detailed cross-sectional view along line 4—4 of FIG. 1; and

FIG. 5 is a cross-sectional view along line 5—5 of FIG. 2

DETAILED DESCRIPTION OF THE INVENTION

Referring now to the drawings, a preferred embodiment of the invention may be described in detail.

An engine cover 10, in accordance with a preferred embodiment of the invention, is illustrated in FIG. 1 in its fully-installed state. The cover 10 includes a frame 12 that is shaped and sized to fit around an engine access opening 14 in the cab of a motor vehicle, of the "cab-over-engine" configuration. As in typical "cab-over-engine" designs, the engine access opening 14 is located in the floor 16 of the cab and an adjacent portion of the firewall 18, thereby accommodating an engine 19 which protrudes through the opening. The frame 12 has a first, horizontal portion 20 which rests on the floor 16, and a second, substantially vertical portion 22 that rests on or against a portion of the firewall 18. (The second frame portion 22 may deviate from the vertical somewhat, depending upon the angle of the firewall 18.) The first and second frame portions 20 and 22 are joined at a bendable hinge portion 24, which may be formed by an area of reduced thickness in the frame material. A suitable material for the frame 12 may be a somewhat flexible plastic that is rigid enough to be self-supporting.

The frame 12 supports an inflatable cover structure comprising an outer sheet 26 and an inner sheet 28 of flexible, resilient material that is non-porous so as to allow the sheets 26 and 28 to be inflated from within, as will be described below. The sheets are preferably made from a transparent plastic material, in heavy sheet or film form. The plastic should be one that is resistant to detergents, grease, oil, and conventional solvents. Certain vinyl plastics are good candidates.

The peripheral edges of the sheets 26 and 28 are sealingly attached to the frame 12 by a process such as heat-sealing or ultrasonic sealing to assure air-tightness. The sheets 26 and 28 are internally connected by a plurality of collapsible spacer elements 30, as best shown in FIGS. 2 and 3. The spacer elements 30 separate the two sheets 26 and 28 to form an inflatable space or chamber 32 therebetween. This chamber 32 is, inflatable through an inflation valve 34, of any conventional design, well-known in the art, provided in the outer sheet 26. As best shown in FIG. 4, a simple inflation valve 34 may comprise a tubular passage 35 into the chamber 32 through the outer sheet 26, with a sealing cap 36 used to selectively open and close the passage 35.

The outer sheet 26 has a central aperture 37, and the inner sheet 28 has a similar central aperture 38. With the inner sheet 28 underlying the outer sheet 26 as shown, the central apertures 37 and 38 are aligned in co-registration. The outer sheet 26 and the inner sheet 28 are sealingly attached to each other around the periphery of the aligned central apertures 37 and 38 by a peripheral wall 40 that is heat sealed or ultrasonically sealed to each of the sheets 26 and 28. The peripheral wall 40, connecting the apertures 37 and 38, defines a passage for a cleaning implement, as will be described below.

To install the cover 10, the chamber 32 is inflated with air introduced through the valve 34 from a suitable source, such as a pump. If a pump is lacking, the chamber 32 may be inflated by mouth. The inflation of the chamber 32 causes it to expand, increasing the separation between the sheets 26 and 28. As the chamber 32 expands, the spacer elements extend from their collapsed positions to their fully-extended positions. The maximum extension of the spacer elements 30 limits the separation between the sheets 26 and 28. This limitation of the separation forces the inner sheet 28 to follow, somewhat, the outwardly convex contour of the outer sheet 26. The result, after inflation is to form the sheet 26 and the inner sheet 28 into semi-rigid inner and outer cover elements, respectively, enclosing the engine access opening 14 and the engine 19 contained therein.

When the cover 10 is inflated, a cleaning implement such as a hose 42 can be passed into the interior through the passage formed by the apertures 37 and 38 and the peripheral wall 40 therebetween. The hose 42 can then be used to wash the engine 19, with the cover 10 shielding the interior of the cab from the spray. Since the sheets 26 and 28 are transparent, the user's observation of the cleaning is not obstructed.

It may be desirable to provide some means for partially or totally closing the aperture 37 in the outer sheet 26, either to minimize the leakage of spray, for example, around the hose 42, or to block the exit of water through the aperture 37 when the bottom of the engine 19 is washed from the underside of the vehicle. To this end, a zipper 44 may be used to provide such a closure.

It may also be advantageous to provide enhanced stability for the cover 10. This can be accomplished, for example, by detachably fastening the frame 12 to the firewall 18 by means such as a hook-and-loop fastener 46, of the type marketed under the trademark "VELCRO". Thus, for example, as best shown in FIG. 2, one portion 46a of the hook-and-loop fastener 46 can be adhesively attached to the vertical frame portion 22, while the other portion 46b of the fastener 46 can be adhesively attached to the firewall 18 [or, alternatively, to the dashboard (not shown)].

When use of the cover 10 is completed, the sheets 26 and 28 are deflated by opening the valve 34 to exhaust the air from the chamber 32. As the air is removed, the spacers 30 are collapsed to their minimum lengths, thereby allowing the sheets 26 and 28 to be compressed to their minimum separation. The frame portions 20 and 22 can then be folded toward each other by means of the hinge portion 24. Thus collapsed and folded, the cover 10 can be stored in a relatively small space until needed again.

From the foregoing description, it can be seen that the engine cover in accordance with the present invention provides easily-installed protection for the interior of the vehicle when the engine is washed. Moreover, the cover does not significantly impair the user's view of the engine while washing it. Furthermore, the cover is light in weight, and foldable for easy transportation and storage.

While a preferred embodiment of the invention has been described, it will be appreciated that certain variations and modifications will suggest themselves to those skilled in the pertinent arts. Thus, most obviously, the cover can be made in a wide variety of shapes and sizes to accommodate the engine compartments of different vehicle models. In addition, various types of closure means can be substituted for the zipper 44. In fact, such closure means may be omitted, if desired, especially if the apertures 37 and 38 are small. Likewise, the detachable fastening means (the hook-and-loop fastener 46 in the preferred embodiment) may assume many forms, and may also be omitted in certain applications.

These and other modifications should be considered within the spirit and scope of the present invention, as described in the claims which follow.

What is claimed is:

1. A cover for use with a motor vehicle engine that is accessible from within the cab of the vehicle, said cab having an engine access opening in the floor of said cab and in an adjacent wall, said cover comprising:
   a frame adapted to rest on the floor and the wall of the cab around the access opening;
   a first inflatable sheet sealingly attached around its periphery to said frame, said first sheet having a first central aperture;
   a second inflatable sheet underlying said first sheet and sealingly attached around its periphery to said frame, said second sheet having a second central aperture in registration with said first central aperture, said first and second sheets being sealingly attached to each other around said first and second central apertures;
   expandable spacer means, internally connecting said first and second sheets, for providing an expandable space therebetween; and
   air inlet means in said first sheet for allowing the expansion of said space by the introduction of pressurized air thereinto, the expansion of said space thereby inflating said first and second sheets into semi-rigid outer and inner cover elements, respectively;
   whereby an implement for cleaning the engine can be passed into the interior of said inner cover element through said first and second central apertures.

2. The cover of claim 1, wherein said first and second sheets are substantially transparent.

3. The cover of claim 1, further comprising closure means for selectively closing said first central aperture.

4. The cover of claim 1, wherein said frame comprises:
- a first frame portion adapted to rest on the floor of the cab around the access opening; and
- a second frame portion joined to said first frame portion at an angle and adapted to rest against the wall around the access opening.

5. The cover of claim 4, further comprising hinge means, at the juncture between said first and second frame portions, for allowing said first and second frame portions to be folded together.

6. The cover of claim 4, further comprising detachable fastening attachment means for detachably fastening said frame to the wall around the access opening.

7. The cover of claim 6, wherein said detachable fastening means comprises hook-and-loop fastening means on said second frame portion and on the wall.

8. A cover for a motor vehicle engine that is accessible from within the cab of the vehicle through an access opening in the floor and the adjacent firewall of the cab, said cover comprising:
- first and second sheets of inflatable, substantially transparent material spaced apart so as to define an inflatable chamber between them;
- expandable spacer means internally connecting said first and second sheets within said chamber, said spacer means being expandable from a collapsed position when said chamber is deflated to an expanded position when said chamber is inflated, said expanded position thereby limiting the amount of separation between said first and second sheets when said chamber is inflated;
- framing means for (a) providing a substantially airtight seal between the peripheral edges of said first and second sheets, and (b) resting said cover on the floor and the adjacent firewall around the access opening therein;
- air inlet means in said first sheet for allowing the introduction of air into said chamber to inflate said chamber and to expand said spacer means to said expanded position, thereby to form said first and second sheets into semi-rigid outer and inner cover elements, respectively;
- a first central aperture in said first sheet; and
- a second central aperture in said second sheet in registration with said first central aperture, said first and second sheets being sealingly attached to each other around said first and second central apertures;
- whereby an implement for cleaning the engine can be passed into the interior of, said inner cover element through said first and second central apertures.

9. The cover of claim 8, further comprising closure means for selectively closing said first central aperture.

10. The cover of claim 8, wherein said framing means comprises:
- a first frame portion adapted to rest on the floor of the cab around the access opening; and
- a second frame portion joined to said first frame portion at an angle and adapted to rest against the firewall around the access opening.

11. The cover of claim 10, further comprising hinge means, formed at the juncture between said first and second frame portions, for allowing said first and second frame portions to be folded together when said chamber is deflated.

12. The cover of claim 10, further comprising means for detachably fastening said second frame portion to the firewall.

13. The cover of claim 12, wherein said means for detachably fastening includes hook-and-loop fastening means on the firewall and on said second frame portion.

14. A cover for use with a motor vehicle engine that is accessible from within the cab of the vehicle through an access opening in the floor and the adjacent firewall of the cab, said cover comprising:
- first and second sheets of inflatable, substantially transparent material, said second sheet underlying said first sheet and spaced therefrom so as to define an inflatable chamber between them, said first and second sheets being sealingly attached to each other around the periphery of a central passage extending through both said first and second sheets;
- expandable spacer means internally connecting said first and second sheets within said chamber, said spacer means being expandable from a collapsed position to an expanded position when said chamber is inflated, said expanded position thereby limiting the amount of separation between said first and second sheets when said chamber is inflated;
- framing means for (a) providing a substantially airtight seal between the peripheral edges of said first and second sheets, and (b) resting said cover on the floor and the adjacent firewall in said cab around the access opening therein, said framing means comprising: a first frame portion adapted to rest on the floor, a second frame portion adapted to rest against the firewall, and a hinge portion foldably joining said first and second frame portions, so that said first and second frame portions can be folded together when said chamber is deflated; and
- a closable air passage in said first sheet for selectively (a) allowing the passage of air into said chamber to inflate said chamber and to expand said spacer means to said expanded position, and (b) allowing the passage of air out of said chamber to deflate said chamber and to collapse said spacer means to said collapsed position, whereby the inflation of said chamber and the expansion of said spacer means forms said first and second sheets into semi-rigid outer and inner cover elements, respectively.

15. The cover of claim 14, further comprising closure means for selectively closing said central passage.

16. The cover of claim 14, further comprising means for detachably fastening said framing means to the firewall.

17. The cover of claim 16, wherein said means for detachably fastening includes hook-and-loop fastening means on the firewall and on said second frame portion.

* * * * *